(12) United States Patent
Silva

(10) Patent No.: US 7,716,796 B2
(45) Date of Patent: May 18, 2010

(54) METHOD FOR INCORPORATING CREMATION REMAINS INTO A PLANT

(76) Inventor: Dave Silva, 708 N. Orchard St., Boise, ID (US) 83706

( * ) Notice: Subject to any disclaimer, the term of this patent is extended or adjusted under 35 U.S.C. 154(b) by 0 days.

(21) Appl. No.: 12/038,929

(22) Filed: Feb. 28, 2008

(65) Prior Publication Data
US 2008/0141508 A1    Jun. 19, 2008

Related U.S. Application Data

(63) Continuation-in-part of application No. 11/557,182, filed on Nov. 7, 2006.

(51) Int. Cl.
A61G 17/00    (2006.01)
(52) U.S. Cl. .......................... 27/1; 47/58.1 R
(58) Field of Classification Search .............. 27/1; 47/1.01 R, 58.1 R, 48.5, 66.6
See application file for complete search history.

(56) References Cited

U.S. PATENT DOCUMENTS

| | | | | |
|---|---|---|---|---|
| 4,977,652 A | * | 12/1990 | Graham | 27/1 |
| 5,701,642 A | * | 12/1997 | Order | 27/4 |
| 5,799,488 A | * | 9/1998 | Truong | 47/1.01 R |
| 5,815,897 A | * | 10/1998 | Longstreth | 27/1 |
| 5,903,961 A | * | 5/1999 | Parker et al. | 27/1 |
| 6,516,501 B2 | * | 2/2003 | Vazquez-Perez | 27/1 |
| 7,272,874 B2 | * | 9/2007 | Staab | 27/1 |
| 7,373,702 B1 | * | 5/2008 | Vonderheide | 27/1 |
| 2008/0083102 A1 | * | 4/2008 | Johnson | 27/1 |

* cited by examiner

*Primary Examiner*—William L. Miller
(74) *Attorney, Agent, or Firm*—Dykas, Shaver & Nipper, LLP; Elizabeth Herbst Schierman

(57) ABSTRACT

A method for incorporating the cremation remains of a deceased being into a plant, wherein cremation remains are deposited either in a hole in which a plant is to be planted or, in the case of an already-planted plant, into a conduit created between the plant's roots and the surface near the plant or into a cavity bored into the stem or trunk of the plant.

1 Claim, 4 Drawing Sheets

METHOD FOR INCORPORATING CREMATION REMAINS INTO A PLANT

CROSS-REFERENCE TO RELATED APPLICATIONS

This application is a continuation-in-part application of application Ser. No. 11/557,182, filed Nov. 7, 2006, entitled Remote Access Memorial Viewing System, which is pending and incorporated herein by this reference.

FIELD OF THE INVENTION

The invention relates generally to memorials, such as forestaries, and more particularly to a method for incorporating cremation remains into a plant, such as in a tree located within a forestary or memorial grove, which may be viewed by friends, relatives, and acquaintances of the deceased individual via a viewing service.

SUMMARY OF THE INVENTION

The present invention includes a system for allowing remote viewing of a particularized item located within a plurality of items; such as a particular gravesite within a cemetery, or a particular tree within a memorial grove or forestary. In particular the present system includes at least one viewing device positioned within such a location. The viewing device is operatively connected to a host control device. Within the host control device a map of the entire area is stored. Each individual plot, tree, or other designated location within the entire area is plotted on the map. When activated, the system is capable of activating the viewing device to capture and transmit images of a particularized pre-selected location to a designated remote receiving device. The access, gathering, and distribution of these images all operated under the control of the host control device.

One of the particularized items that may be viewed is a memorial for the dead in which the cremation remains of a deceased individual or individuals are incorporated into a plant. In one example, the cremation remains of members of a family may be incorporated into a family tree. This family tree is planted in a hole that contains the cremated remains of at least one family member. These cremated remains are then incorporated in the tree as it grows and strengthens. As additional members of the family pass away and are cremated, their ashes can also be fed to the roots of the tree or be placed in the trunk of the tree. That is, ashes may be fed to the roots of an already-planted tree by channeling the ashes to the roots through a conduit that defines and ensures a passageway for these remains to reach the root system of the tree. Ashes may be place din the trunk by boring a cavity in the trunk and depositing the ashes therein. A collection of these family trees create a collection called a forestary, which is one of the embodiments in which the remote access viewing portion of the invention is utilized.

The remote access viewing portion of the invention can be utilized in a variety of circumstances besides the embodiments that are described herein. In particular the remote access viewing system of the present system includes at least one viewing device positioned within such a location. This viewing device is operatively connected to a host control device. Within the host control device a map of the entire area is stored. Each individual plot, tree, or other designated location within the entire area is plotted on the map. When activated, the system is capable of activating the viewing device to capture and transmit images of a particularized pre-selected location to a designated remote-receiving device. The access, gathering, and distribution of these images are all operated under the control of the host control device.

In the preferred embodiment of the invention, the viewing device is a remote operated web camera that is positioned in a pre-selected location and is capable of being moved into and out of a variety of positions. In some particular situations, a plurality of such viewing devices may be utilized to allow for the desired levels of coverage in a particularized location. In some circumstances, various images may be transmitted and displayed on a particular display device while under the control of the host control device.

In another embodiment of the invention, the viewing device is a satellite viewing device that is capable of capturing images of the pre-selected location and transmitting those images to an image receptor on Earth. For example, a viewing device such as the type used in conjunction with GOOGLE EARTH™ may be incorporated in the system as the viewing device.

In the preferred embodiment of the invention, the host control device is able to perform a variety of functions and includes a variety of features. In one embodiment of the invention these functions include an embodiment where the entry of an appropriate password link causes the viewing device to go to a location wherein a particular item is displayed and for images from this location to be transmitted. This feature is enabled by the linking of a particularized password to a particular location within a predefined map, which is included within and operatively connected to the command hierarchy that is located in the host control device.

The command hierarchy includes a system of signals, which prompt a particular response once a desired and designated input has taken place. These desired inputs may include a variety of types and a variety of information that is related to the account to which the password is linked. Depending upon the particular embodiment of the invention, this may include various types of information related to information such as: the names of the parties, the location of the sites that are to be viewed, the type and level of subscription, and other similar information.

Upon the input of these items into the system, the command hierarchy will engage in a variety of activities including directing a particular viewing device to capture an image from a pre-designated location that is affiliated with this account and to transmit this image to a distant location. In addition, the command hierarchy may allow viewing of other sites by preprogrammed selection or allow active or limited control movements over the camera device itself. Depending upon the exact configuration of the invention these items may take place by including various items such as the input of a designated authorization code or other similar actions. Such active control movements allow the remote operated web camera or similar viewing device to scroll or pan over and through a designated area. In some embodiments of the invention, the host controller displays the images through a graphic user interface that may also be utilized to allow the purchase of ancillary services such as flower delivery, grave site maintenance, and/or other actions.

Preferably, the function of this system is made possible by the interconnection and communication of the images and the inputs occurring through a computer based network such as the World Wide Web. However, depending upon circumstances, other systems, devices, and features may also be utilized. Depending upon the exact necessities of the user, this graphic user interface and the methods of transmitting, receiving, and displaying moving images from one location to another may also be modified.

In such a system, the present invention is utilized by mapping a cemetery or memorial area so as to provide a map of particularized plots; assigning each of these particularized plots with a particular identifier; linking each of these particular identifiers with a user name and password; creating a command hierarchy wherein a user name and password is received through an inputting media; matching the user name and password to a particular identifier; commanding the remote operated web cam to present an image of the particularized plot that is assigned to the particular identifier that matches the user name and password; and transmitting this image from said remote operated web cam through a communication media.

In addition to these basic features various modifications to this method and system of operation may also take place. These additional steps may include engaging in any of the following activities: providing an interface wherein parties may purchase additional services for said grave side such as flower delivery, landscaping, message delivery, and candle placement; providing access to remote viewing of other locations inside or outside of said cemetery; changing passwords based upon a preselected criteria; capturing an image on a particular date and time; storing said image in a designated location; and allowing access to said stored image upon the providing of an appropriate name and password by a user. In addition to these additional steps and features, other various modifications may also be made to the system according to the needs and necessities of the user.

The portion of the invention regarding the method for incorporation of cremation remains in a plant involves the steps of providing cremation remains of at least one deceased being, providing a plant to be planted, digging a hole in which to plant the plant, depositing the cremation remains into the hole, planting the plant in the hole containing the cremation remains, and filling in any empty space in the hole with organic material. In this way, as the plant grows, the cremation remains that were placed in the hole in which the plant was planted will be incorporated into the growing plant. The living, growing plant thereby becomes a memorial to the deceased beings whose cremations remains are incorporated into the plant. The plant may then act as a particularized item to be remotely viewed using the remote access viewing portion of the invention.

In embodiments in which a plant has already been planted, to incorporate the cremation remains of a deceased being into the plant, a conduit is created between the ground surface near where the plant is planted and the root system of the plant. The cremation remains of the deceased being are then placed into the conduit, and the remaining space in the conduit filled in with an organic material. As the plant continues to grow, the cremation remains deposited in the conduit will be incorporated in the soil around the plant and therefore into the plant as it grows.

In other embodiments in which a plant has already been planted, to incorporate the cremation remains of a deceased being into the plant, a cavity is bored in the stem or trunk of the plant, to allow access to the inside of the plant from the outside of the plant. The cremation remains of the deceased being are then placed into the cavity, either directly or by first inserting the remains into a container, which may either be biodegradable or non-biodegradable. Once the remains are deposited in the cavity, the remaining space of the cavity is filled in with an organic material.

In the preferred embodiment of the method for incorporating cremation remains in a plant, the cremation remains of a deceased being are incorporated into a plant by either depositing the remains in a hole in which the plant is to be planted, by depositing the remains into a conduit created between the ground surface near where a plant is already planted and the roots of the plant, or by depositing the remains into a cavity bored into the stem or trunk of an already-planted plant. Subsequently, when relatives of the deceased being's family also become deceased, their cremation remains may be incorporated into the same plant, either by depositing the relatives' remains into conduits to the roots of the plant or into cavities in the stem or trunk of the plant.

The purpose of the Summary is to enable the public, and especially the scientists, engineers, and practitioners in the art who are not familiar with patent or legal terms or phraseology, to determine quickly from a cursory inspection, the nature and essence of the technical disclosure of the application. The Summary is neither intended to define the invention of the application, which is measured by the claims, nor is it intended to be limiting as to the scope of the invention in any way.

Still other features and advantages of the present invention will become readily apparent to those skilled in this art from the following detailed description describing preferred embodiments of the invention, simply by way of illustration of the best mode contemplated by carrying out my invention. As will be realized, the invention is capable of modification in various obvious respects all without departing from the invention. Accordingly, the drawings and description of the preferred embodiments are to be regarded as illustrative in nature, and not as restrictive in nature.

DESCRIPTION OF THE PREFERRED EMBODIMENTS

Figure 1:
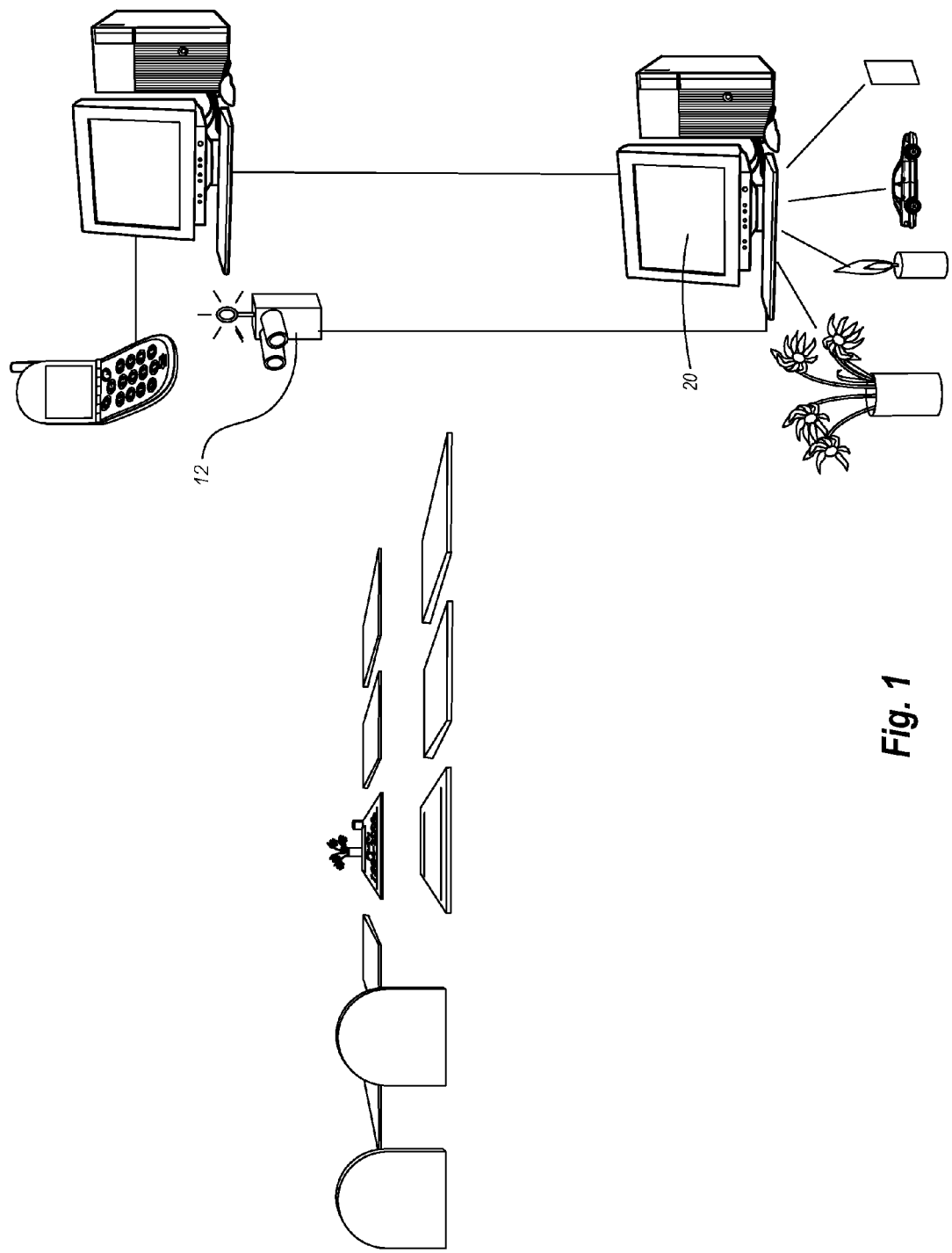
FIG. 1 is a graphical representation of one embodiment of the system of the present invention.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

The present invention includes a system and method for providing a variety of services to persons at a remote location from where a loved one is interred as well as a method for incorporating cremation remains into a plant. FIGS. 1-4 show a variety of views of the system and methods involved in one embodiment of the present invention. While these particular embodiments of the invention are shown, it is to be distinctly understood that the invention is not limited thereto but may be variously embodied according to the needs and necessities of a user.

Referring now to FIG. 1, an embodiment of the system of the present invention is shown. The present invention 10 is shown positioned within a memorial location that contains both a cemetery (made up of a plurality of grave markers such as headstones, foot stones, or other markers that denote the location of the grave of a particular individual) as well as forestary or memorial grove where the remains of a particular individual are stored in a particular tree. While the present invention is shown as a system located within this particular embodiment, it is to be distinctly understood that the invention is not limited thereto but may be variously embodied so as to fit a particular need in a variety of other positions and locations. This includes but is not limited to mausoleums, memorial monuments, and other situations where a particular object is located within a field of other objects.

The present invention is made up of at least one viewing device 12, which is positioned at a location within a designated area so as to be able to provide preselected and designated views of a variety of locations within the designated area. In the example, shown in FIG. 1, the viewing device 12 is positioned within a cemetery, preferably in a location where all of the gravesites are accessible and viewable. In other embodiments of the invention, a plurality of viewing devices 12 may be positioned in various locations all over the cemetery. Each of these various viewing devices is operatively connected to the host control device 14.

This host control device 14 contains a command hierarchy that is configured to receive input from a user who is typically in a remote location and to select an appropriate viewing device 12 to capture an image of the particular location. The remote user connects to the system through any of a variety of connection devices or methods including direct cable wiring, infrared, wireless communications or any other type of device that enables a connection between the host control device 14 and the remote user.

In the preferred embodiment of the invention, the viewing device 12 includes at least one remote operated video camera, preferably a web based camera or web cam. This device is placed in a particular location within a cemetery and is configured so as to allow various portions of the cemetery to be viewed. Depending upon the particular circumstances regarding where the device is placed, the type, number and placement of these devices may be variously configured. In one embodiment of the invention this may be done by one camera that can be moved in a variety of directions so as to be able to view all of the desired and designated portions of the cemetery. However, in other embodiments of the invention several cameras may be used so as to allow for complete and desired levels of coverage throughout the cemetery. In other embodiments of the invention, individual web cameras may be placed in position so as to be able to view each and every particular headstone or burial plot within the cemetery. The modifications of this basic system may be varied according to the needs and necessities of the user, as well as raising other factors related to costs and maneuverability on the part of the business owner.

The viewing device 12, which in this case is preferably a remote operated web cam, is operatively connected to a host device 14 and is configured to transmit information from the remote operated camera 12 to any of a variety of receiving devices 16. In some embodiments of the invention, these receiving devices 16 may also be the source 18 from which input into the host system 14 is accomplished.

As is shown in the figures, a variety of devices may be used to provide input or receive transmissions from the host control device 14. It is envisioned that any device that has the ability to connect to the combination of computers commonly referred to as the World Wide Web or Internet may be utilized. This includes, but is not limited to, cell phones, computers, smart phones, telephones, and any other such types of devices. It will also be recognized with various modifications that other types of devices for viewing may also be utilized in the present system.

Figure 2:
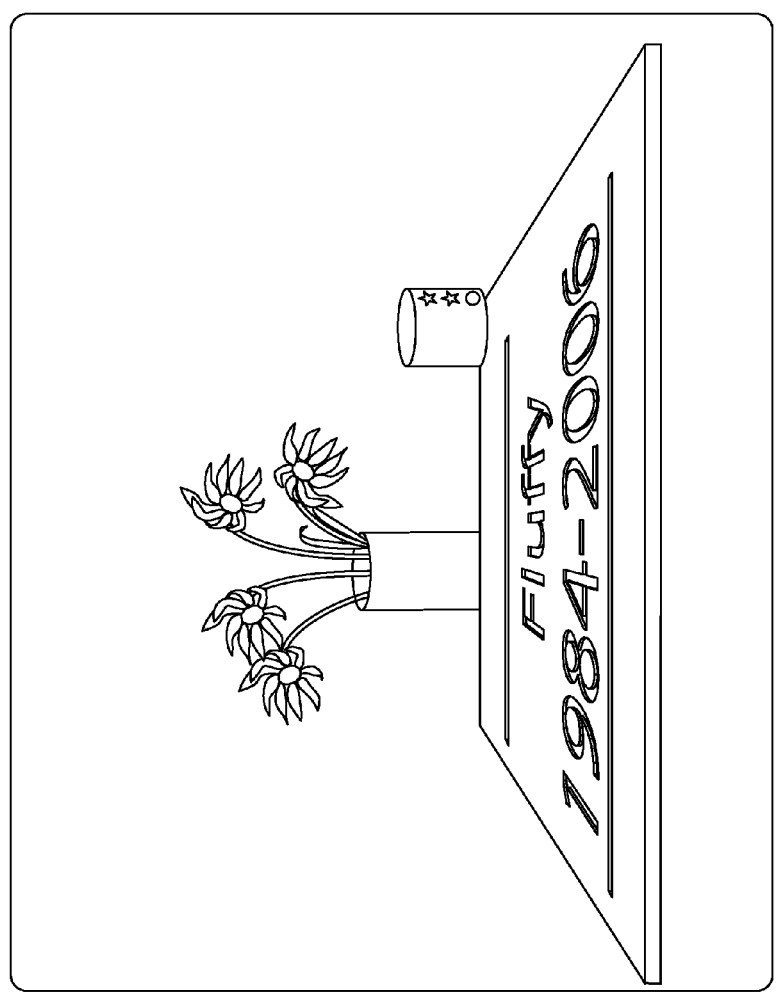
FIG. 2 is a detailed, planned view of one embodiment of the graphical user interface in the present invention.

The display of the particular item is shown through a designated graphical user interface (GUI) 20 such as the one shown in FIG. 2. While FIG. 2 shows one particular demonstration of a graphic user interface, it is to be distinctly understood that the invention is not limited to the particular GUI that is shown in this figure, but that this configuration may be variously embodied to include a variety of other features and to include a variety of other formats as well. The GUI 20 provides a display that includes an image of the particular gravesite that is connected to the username and password. In addition, a variety of other prompts 22 for additional actions, such as store images, retrieve images, buy flowers, send messages, place candles, request service, log out of the service, or other options may also be made available to a user. The listing of the aforementioned options are merely intended to illustrate the potential uses of the present invention and should not be construed as a limitation on the device itself.

In a preferred embodiment of the invention, the physical location of each individual plot, gravesite, tree, or urn within the memorial is a sign of a particular identifier. In this embodiment of the invention, the particular identifier is connected to a physical location on a map, which is serviced by a particular camera. The identifier and the map are input into the host control device, which is input into the host computer, and a user name and password are connected with this identifier. In a simple embodiment of the invention, the input of a designated user name and password into the host system triggers the command hierarchy to display an image from the plot, which is linked to this username and password, by means of the identifier. In more complex embodiments of the invention various modifications to this basic simple design may be had.

In various other embodiments of the invention, the display from the viewing device 12 is shown through a graphical user interface such as the graphical user interface that is shown in FIG. 2 of the present invention. It is of course, to be understood that the example graphic user interface that is shown in FIG. 2 is merely intended for illustrative purposes and should not be considered limiting in any way to the scope of the application. This graphical user interface, in addition to showing a desired view of the particular plot, may also provide the user with a variety of other options. This may be dependent upon the system that has been set up by the business owner and the level of complexity of the equipment and tools, which are at the disposal of the parties.

In one embodiment of the invention, the user may have capabilities to control the camera from a remote location. This would enable the user to pan, tilt, and scroll around the designated area so as to be able to view a variety of neighboring sites, the sky, or other items that are in the potential view of the remote camera. In other embodiments of the invention, links may be provided to enable the user, from this singular graphical user interface, to access other locations. For example, through such an embodiment a party may be able to view three separate plots in three separate cemeteries located in three separate states or potentially three separate countries. In each of these embodiments, according to the set up that is available at the individual cemeteries, parties would be able to, as has been discussed previously, move the video cameras to pan to a variety of other locations.

In addition, some embodiments of the invention may also allow a user to store images from a particular day within a database that can then be accessed as needed in order to retrieve, modify, or delete these images. In other embodiments of the invention the graphical user interface may also provide links for a variety of services related to the appropriate subject matter in which the device is displayed. These include potentials such as utilizing the graphical user interface to send flowers, messages of condolences, arrange for placement of candles upon the gravesite, arrange for landscaping from the caregivers at the cemetery, or any of a variety of other actions as well.

The input related to the purchase of these services takes place through the host computer 14. This host computer is preferably appropriately equipped and adapted to receive information through a transport media either directly or remotely. The particular technology through which this may be accomplished may be varied according to the particular needs and necessities of a person of skill in the art.

Figure 3:
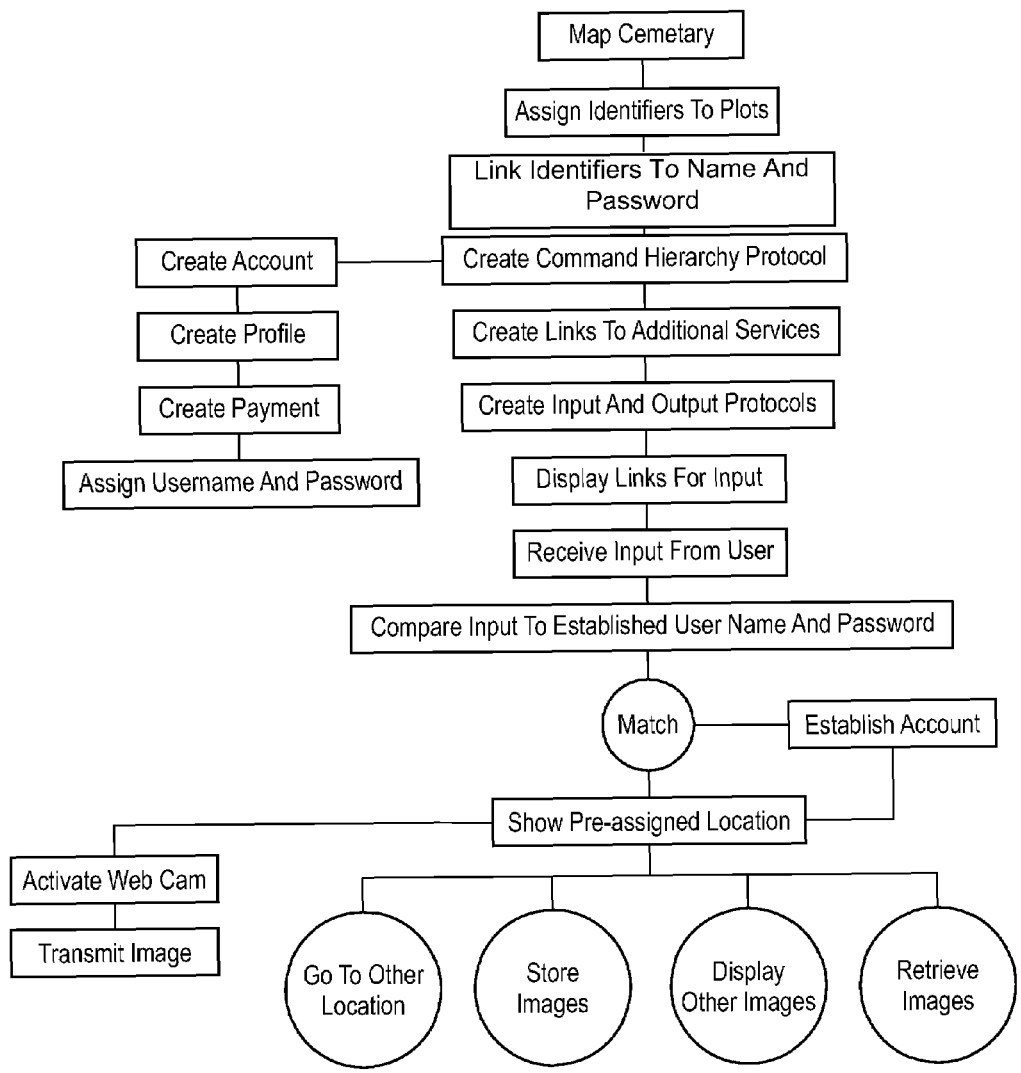
FIG. 3 is a flow chart of method steps involved in one embodiment of the present invention.

The present invention as shown in FIG. 3 includes a variety of steps, which are utilized in the creation, operation, and maintenance of this system. In one embodiment of the invention the system is set up by mapping the area and assigning each of the plots or subareas with a particular identifier. These identifiers are then linked to the user name and password in the hierarchy, which has the ability to control at least one, if not a plurality, of video cameras to ensure the proper coverage of all of the requisite portions of the cemetery is obtained. The input of the user name and password creates a home that designates a particular location to which a particular camera will always be directed when the home portion is selected by the user. Depending upon other embodiments of the invention and various links, scrolling abilities, transmissions, image storage, image access, and other features may also be accomplished.

In the event that a party logs onto the system and does not have a user name or password, a general screen may be displayed. In this display, the party will be offered the ability to create an account and an account profile that will allow the party to view the various portions of the cemetery. In addition to these particular features, various other combinations and modifications to this invention may also be obtained according to the needs and necessities of the user.

Figure 4:
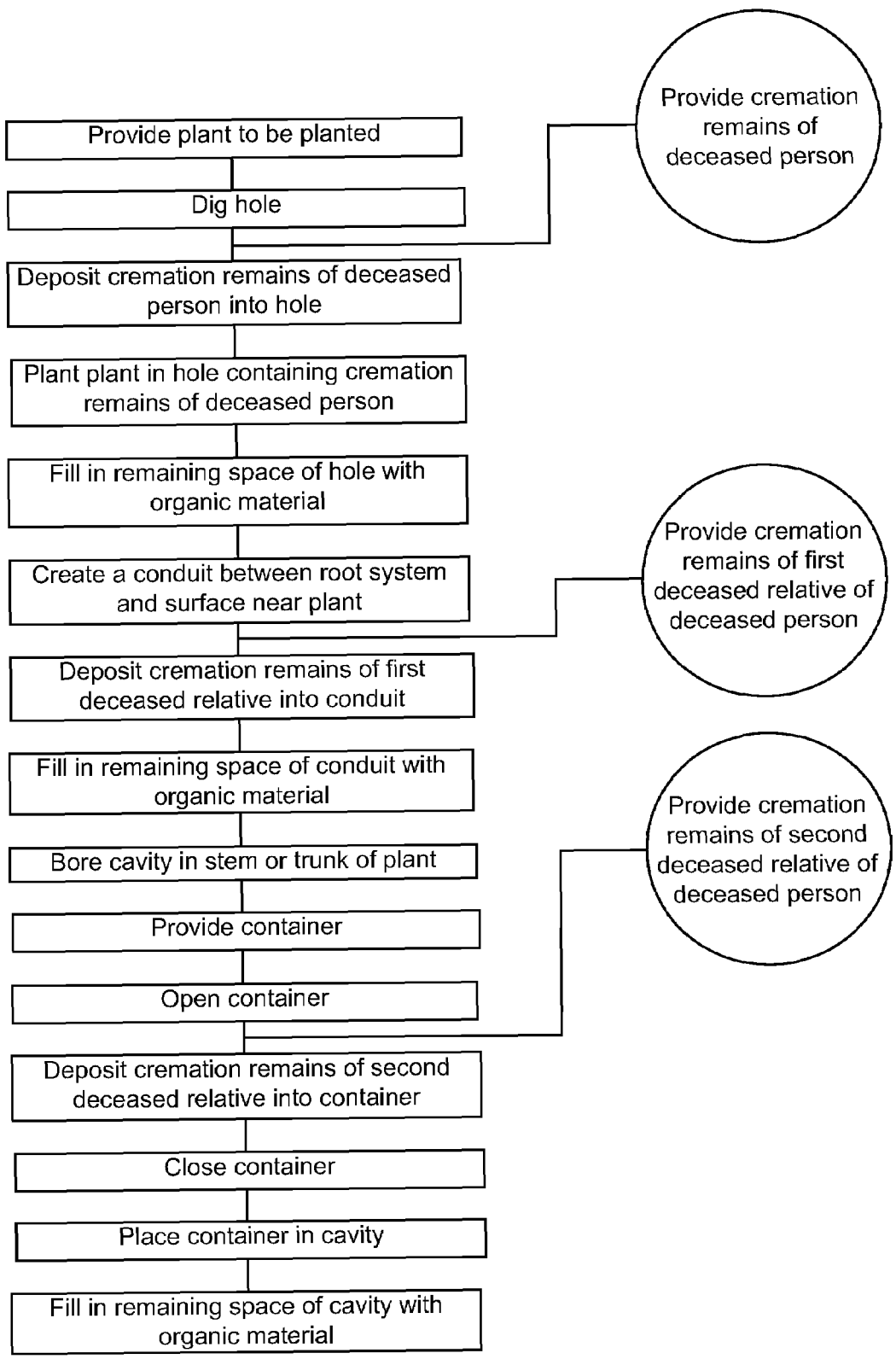
FIG. 4 is a flow chart of method steps involved in one embodiment of the present invention's method of incorporating cremation remains in a plant.

FIG. 4 depicts a series of steps involved in the method for incorporating cremation remains into a plant, according to one embodiment of the present invention. As shown, in the preferred embodiment, the cremation remains of a deceased person and deceased relatives are stored in a plant. More specifically, a plant to be planted is provided, a hole is dug, and the cremation remains of a deceased person are provided. The cremation remains of the deceased person are deposited into the hole, and the remaining space in the hole is filled in with an organic material such as dirt, soil, mulch, or the like. When a relative of the deceased person passes away and is cremated, the cremation remains of the first deceased relative are provided and a conduit created between the root system of the plant and the ground surface near the plant. The cremation remains of the first deceased relative are deposited into the conduit, and the remaining space of the conduit filled in with an organic material such as dirt, soil, mulch, or the like. Subsequently, if and when a second relative of the deceased person passes away and is cremated, the cremation remains of the second deceased relative are provided and a cavity in the stem or trunk of the plant is bored. In the preferred embodiment, a container is provided and opened. The cremation remains of the second deceased relative are deposited into the container, which is then closed. The closed container containing the cremation remains of the second deceased relative are then deposited into the cavity, and the remaining space of the cavity is filled in with an organic material. For example, when the cavity is bored into the trunk of a tree, the remaining space of the cavity may be filled in with a wooden plug to disguise the cavity's location.

The container described above may either be a non-biodegradable or biodegradable container. If the container is biodegradable, as the plant grows, the container will degrade, thereby allowing the cremation remains of the deceased to be incorporated into the stem or trunk of the plant as it continues to grow.

As further relatives of the deceased being, or others who were somehow associated with the deceased being, pass away and are cremated, their cremation remains may be stored in the same plant or a near-by plant either by depositing the cremation remains into a conduit to the roots of the plant or into a cavity bored in the stem or trunk of the plant.

In other embodiments of the present invention, more than one deceased being's cremation remains may be deposited into any of a hole, conduit, or cavity as described above. In still other embodiments of the present invention, the cremation remains of a deceased being may be stored in the plant by dividing the remains and depositing portions of the remains into a hole, conduit, and cavity as described above, or in any combination thereof.

Further, while FIG. 4 depicts that the cremation remains of a deceased being are deposited into a hole, the cremation remains of a first deceased relative are deposited into a conduit, and the cremation remains of a second deceased relative are deposited into a cavity, other embodiments of the invention may deposit the cremation remains into a different type of depository. For example, the cremation remains of a deceased being may be deposited into a conduit, and the cremation remains of a first and second deceased relative may be deposited into cavities. Thus, the cremation remains of any particular deceased being may be stored in the plant either by depositing the remains in a hole, when the plant to store the remains has not yet been planted, or by depositing the remains in a conduit or cavity, when the plant to store the remains has already been planted.

Other embodiments may also include the steps of providing a plaque, including on the plaque information about the deceased beings whose cremation remains are incorporated in a plant, and posting the plaque in the vicinity of the plant.

The figures and description above illustrate but do not limit the present invention. It should be understood that there is no intention to limit the invention to the specific form disclosed; rather, the invention is to cover all modifications, alternative constructions, and equivalents falling within the spirit and scope of the invention as defined in the following claims.

What is claimed is:

1. A method of incorporating cremation remains of deceased family members into a tree comprising the steps of:
   incorporating cremation remains of a deceased person by
      providing cremation remains of said deceased person;
      providing a tree to be planted, wherein said tree has a trunk and a root system;
      digging a hole in a ground area in which to plant said tree;
      depositing said cremation remains of said deceased person into said hole;
      planting said tree in said hole containing said cremation remains of the deceased person, wherein afterwards said hole has a remains-containing portion, a tree-containing portion, and remaining-space portion; and
      filling in said remaining-space portion of said hole with an organic material;
   incorporating cremation remains of a first deceased relative of said deceased person by providing cremation remains of said first deceased relative of said deceased person;
creating a conduit between said ground area near said tree and said root system of said tree;
depositing said cremation remains of said first deceased relative of said deceased person directly into said conduit, wherein afterwards said conduit has a conduit-with-remains portion and a conduit-remaining-open-space portion; and
filling in said conduit-remaining-open-space portion with an organic material; and
incorporating cremation remains of a second deceased relative of said deceased person by
providing cremation remains of said second deceased relative of said deceased person;
boring a cavity in said trunk of said tree;
providing a non-biodegradable container;
opening said non-biodegradable container;
depositing said cremation remains of said second deceased relative of said deceased person into said non-biodegradable container;
closing said non-biodegradable container;
placing said non-biodegradable container inside said cavity in said trunk of said tree, wherein afterwards said cavity has a cavity-with-container portion and a cavity-remaining-open-space portion; and
filling in said cavity-remaining-open-space portion with a wood-like material.

* * * * *